(12) United States Patent
Relyea et al.

(10) Patent No.: US 9,449,413 B2
(45) Date of Patent: Sep. 20, 2016

(54) IMAGE COMPOSITING VIA MULTI-SPECTRAL DETECTION

(71) Applicant: Verizon Patent and Licensing Inc., Arlington, VA (US)

(72) Inventors: Don Relyea, Dallas, TX (US); Michelle Felt, Randolph, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 61 days.

(21) Appl. No.: 14/487,050

(22) Filed: Sep. 15, 2014

(65) Prior Publication Data

US 2015/0071551 A1  Mar. 12, 2015

Related U.S. Application Data

(62) Division of application No. 12/619,370, filed on Nov. 16, 2009, now Pat. No. 8,837,855.

(51) Int. Cl.
| | |
|---|---|
| *G06K 9/00* | (2006.01) |
| *G06T 11/60* | (2006.01) |
| *G01J 3/02* | (2006.01) |
| *G01J 3/28* | (2006.01) |
| *H04N 5/222* | (2006.01) |
| *H04N 5/225* | (2006.01) |
| *H04N 9/75* | (2006.01) |
| *G06K 9/46* | (2006.01) |
| *G06T 5/00* | (2006.01) |

(52) U.S. Cl.
CPC .................. *G06T 11/60* (2013.01); *G01J 3/02* (2013.01); *G01J 3/0264* (2013.01); *G01J 3/0294* (2013.01); *G01J 3/2823* (2013.01); *G06K 9/4604* (2013.01); *G06T 5/00* (2013.01); *H04N 5/225* (2013.01); *H04N 5/2226* (2013.01); *H04N 9/75* (2013.01)

(58) Field of Classification Search
None
See application file for complete search history.

(56) References Cited

U.S. PATENT DOCUMENTS 7,298,869 B1 * 11/2007 Abernathy ........... G06K 9/0063
324/323
7,613,360 B2 * 11/2009 Ma ..................... G06K 9/00771
382/100

(Continued)

OTHER PUBLICATIONS

James W. Davis and Vinay Sharma "Background-subtraction Using Contour-based Fusion of Thermal and Visible Imagery", published in ScienceDirect—Computer Vision and Image Understanding 106 (2007), pp. 162-168, by James W. Davis and Vinay Sharma.*

(Continued)

*Primary Examiner* — Wesley Tucker (57) ABSTRACT

A video image capture component includes a light source operable in a first spectrum, a first image detector operable in the first spectrum, a second light source operable in a second spectrum, and a second image detector operable in the second spectrum. A filtering component generates a combination image by filtering a first image obtained by the first image detector with a high-contrast filter, resulting in a high-contrast image, and masking a second image obtained by the second image detector using the high-contrast image. A compositing component creates a composite image from the combination image and a selected image. A display component displays the composite image.
Alternative systems and methods for creating a combination image include techniques involving thermal imaging, laser detection, and narrow band frequency detection.

13 Claims, 8 Drawing Sheets

(56) References Cited

U.S. PATENT DOCUMENTS

2011/0164191 A1* 7/2011 Brown ............... G06K 9/50
348/744
2013/0182077 A1* 7/2013 Holz ............... H04N 5/232
348/46

OTHER PUBLICATIONS

Davis, et al., "Background-subtraction Using Contour-based Fusion of Thermal and Visible Imagery," Computer Vision and Image Understanding, vol. 106, Issue 2-3, pp. 162-182, May-Jun. 2007.

* cited by examiner

IMAGE COMPOSITING VIA MULTI-SPECTRAL DETECTION

CROSS-REFERENCE TO RELATED APPLICATIONS

This application is a division of U.S. patent application Ser. No. 12/619,370, filed on Nov. 16, 2009, which is hereby incorporated by reference in its entirety.

BACKGROUND

It is sometimes desirable to isolate a particular portion of one image and make a composite of that portion of the image with another image, such that the composite image appears to be a single image. One example of such a compositing technique uses a green screen. An actor is positioned in front of the green screen and a first image of the actor is captured. The green portions of the first image are then replaced by portions of a second image, making it appear that the actor was filmed in the environment of the second image. This technique has been used for, e.g., making a weather reporter appear to be standing in front of a wall-sized weather map.

The technique of using a colored background for image compositing is sometimes referred to as color-keying or chroma-key. The screen used in the chroma-key technique may be any color, and often is selected for its spectral distance from a subject of interest. A greater spectral distance allows more accurate isolation of the screen color from the image. For human subjects, blue and green screens are preferred because blue and green are considered to be far from human skin tone on the color spectrum. For non-human subjects, a color may be selected that is far on the color spectrum from the subject. For example, a green plant may be placed against a red screen to more accurately isolate the image of the plant from the red background.

It is not always desirable and/or practical to have a chroma-keyed screen available. It is therefore desirable to have an option for accomplishing an effect similar to the chroma-key technique effect without using a chroma-keyed screen.

BRIEF DESCRIPTION

DETAILED DESCRIPTION

An alternative to the chroma-key technique described above, without using a chroma-keyed screen, is to use multiple emitting sources and multiple imaging devices to capture images of an object in multiple spectral ranges, and then to combine the multiple images for use in compositing with another image. For example, an object may be illuminated with a first light source within a first spectrum range (e.g., incandescent or fluorescent light representing examples of the visible spectrum) and a second light source within a second spectrum range (e.g. an infrared light representing the infrared spectrum), and a camera may capture one image of the object in the first spectrum range and another image of the object in the second spectrum range. A processor may then apply a high-contrast filter to the second spectrum image to generate a high-contrast image including, for example, only black and white. The processor may apply the high-contrast image to the first spectrum image as a mask, to isolate the image of the object from the image of the background. The isolated image may then be composited with another image. The result is an image of an object taken in one setting appearing as if it was taken in a different setting.

A person, for example, may use such a system for compositing images in a home video karaoke application. A home video karaoke application allows a person to appear to be performing with, e.g., a band not present at the home. Continuing with the karaoke example, multiple persons in different locations could perform, and video of the different performances could be transmitted to a computing device for compositing. The composited video could then be transmitted back to one or more of the multiple persons for display. The displayed video would appear to be a video taken of all of the performers in one place. The video background could be from the video from any one of the locations of the multiple persons, or might be any other video or a static image. In this way, a multi-person audiovisual karaoke application across multiple locations could have the appearance of a single-location performance.

Figure 1:
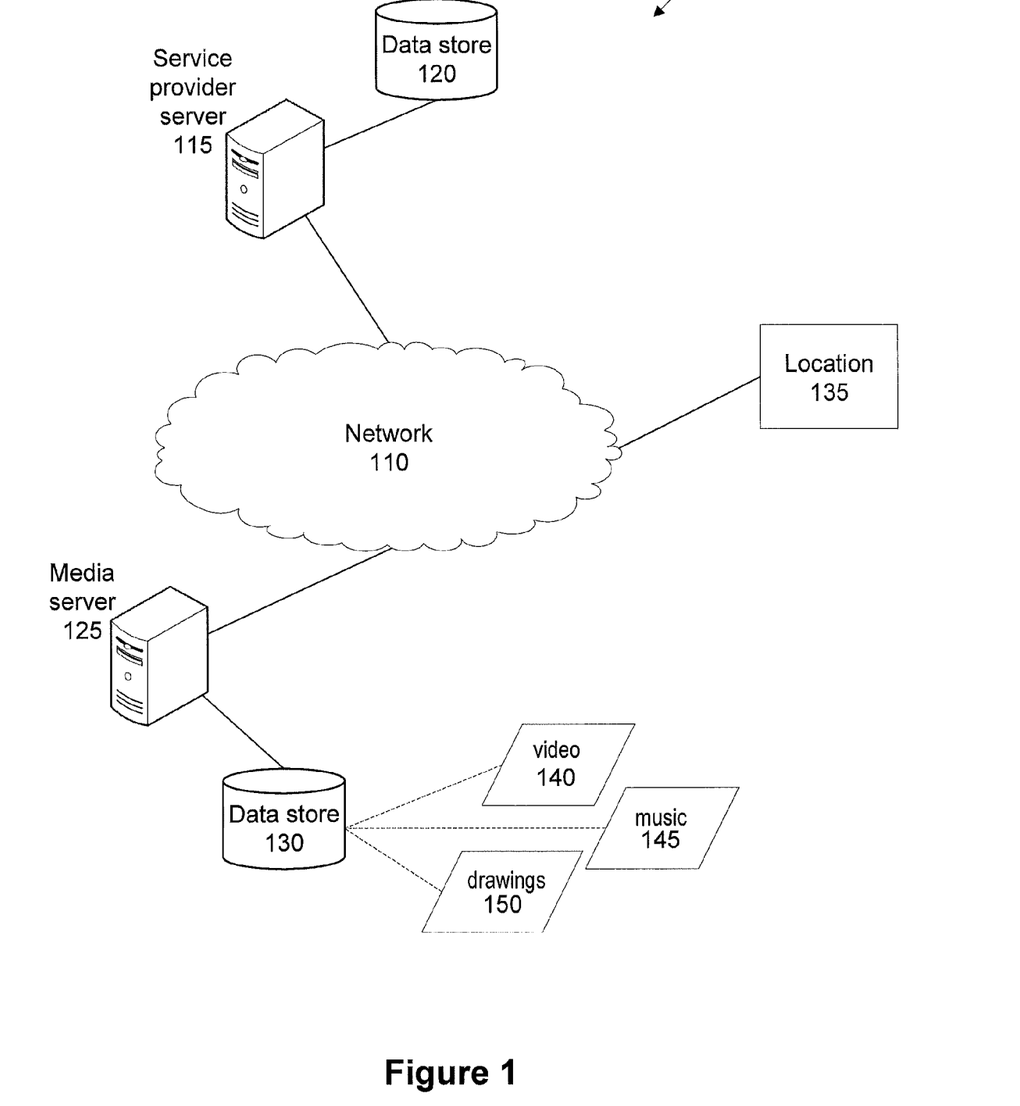
FIG. 1 illustrates an exemplary system for a network exchange of media content.

FIG. 1 illustrates an exemplary system 100 in which images may be generated and composited. The system may include network 110, service provider server 115, media server 125, one or more data stores 120 or 130, a location 135, and one or more media content 140, 145, and 150, represented by way of example as video, music sound recordings, and drawings, respectively. System 100 may take many different forms and include multiple and/or alternate components and facilities. While an exemplary system 100 is shown in FIG. 1, the exemplary components illustrated in FIG. 1 are not intended to be limiting. Indeed, additional or alternative components and/or implementations may be used.

Network 110 is generally but not necessarily a packet network, and may be any suitable network for sending and receiving data, such as the Internet, a local area network, a wide area network, a personal area network, a cellular network, etc. Although communication between some elements in system 100 is illustrated in FIG. 1 as being through a single network 110, network 110 may be a plurality of different networks interconnected with one another and through which communication may be established. Various implementations of system 100 may include a variety of components, information types, and interactions, including, but in no way limited to, those explicitly mentioned herein.

Server 115 represents a provider of network services, and server 125 represents a provider of media content. A network service provider may also provide media content via server 115. Each server 115 and 125 may represent multiple servers and/or multiple providers. Servers 115 and 125 may provide media content from data stores 120 and 130, or may facilitate a transfer or exchange of media content between multiple locations 135, or between one or more locations and servers.

Servers 115 and 125 are described herein as "servers" for convenience, and not by way of limitation, and may include any general-purpose computing device along with operating software and other sets of computer executable instructions to carry out steps described herein. Server 115 with data store 120 may be included within a single computing device or a plurality of computing devices. Similarly, server 125 with data store 130 may be included within a single computing device or a plurality of computing devices. Data stores 120 and 130 may be software applications executing on servers 115 and 125, respectively.

In general, computing systems and/or devices, such as servers 115 and 125, may employ any of a number of well known computer operating systems, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, New York, and the Linux operating system. Examples of computing devices include, without limitation, a computer workstation, a server, a desktop, notebook, laptop, or handheld computer, or some other known computing system and/or device.

Computing devices generally include computer-executable instructions, where the instructions may be executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores such as data stores 120 and 130 may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Media content provided by service provider 115 or media server 125 may include, e.g., representations of visual, aural and olfactory stimuli, such as video 140, music 145, and drawings 150, or combinations of stimuli such as television signals, or "smellavision". Servers 115 and 125 may communicate with each other to obtain media content. For example, service provider 115 may have an operating agreement with the operator of media server 125 such that service provider 115 has access to the media content in data store 130. Servers 115 and 125 may include processes for performing the compositing of images from data store 120 or 130 and/or from a location 135 or from multiple locations 135. Servers 115 and 125 may further include processes for combining selected media types; for example, combining audio from a location 135 and video from a data store 120 or 130.

Location 135 represents any residential or commercial establishment with an imaging system as described below. Any number of locations 135 may be included in a system 100. A physical structure may include multiple locations 135 with image-generation systems, e.g., an imaging system in each of multiple rooms of a house, or multiple imaging systems within one room, or an imaging system inside a house and one outside of the house. Multiple locations 135 may be members of a personal area network (PAN) or local area network (LAN), or may be accessed through network 110.

In a system 100 with multiple locations 135, some of the locations 135 may generate media content while others only receive media content. Alternatively, all of the multiple locations 135 may both generate and receive media content within system 100. A server 115 or 125 may mix generated media from the multiple locations 135, and may further mix generated media from one or more of the multiple locations 135 with media from data store 120 or 130. Media mixing may include, e.g., mixing audio with video, audio with audio, and still images with video images. Each location 135 may have either full or partial control of the manner of mixing media from the multiple locations 135 and data stores 120 or 130, as well as control of the format of mixed media as delivered to the multiple locations 135.

Media mixing control may include, e.g., controlling visual aspects of one or more images, such as controlling intensity, contrast or focus of each generated image from multiple locations 135. Media mixing control may further include, e.g., controlling audio aspects of sound transmissions, such as filtering out selected frequencies, or adjusting volume of each sound transmission from multiple locations 135. Media mixing control generally may include selecting which media content to mix, such as selecting which generating locations 135 to include in the media mix, as well as selecting which locations may receive mixed media. For example, in a video conference, the person who is presently speaking may be displayed composited with a generic conference room background. For such a video conference as described, the person may control the display of the image, or a person in another location may control the display of the image. Further, control may be automatic and voice activated, implemented as a process in a computing device.

Location 135 may be connected to network 110 as illustrated in FIG. 1. For example, groups of students in schools around the world could collaborate on a virtual theater production, wherein the images of the individual actors in the production are composited with scenery and displayed to the student bodies in the theaters of the various schools. As another example, a person may wish to conceal his/her present location 135, and may use the imaging system as described below to transmit his/her image, using a cellular phone, with no composited background, i.e., to transmit an image of the person against a solid color. Alternatively, an image may be transmitted without a composited background to minimize transmission costs, or to minimize required system resources, such as processing power.

Location 135 may alternatively be without a network 110 connection. For example, the imaging technique may be performed by an individual within a home, using a personal computing device for compositing and/or mixing media content. A home system as described may be used, e.g. for a karaoke application, for making a movie, for creating a video diary, for creating a digital photo album, etc. The imaging technique as described below allows a person to easily adapt the capabilities of system 100 to new and creative uses.

Figure 2:
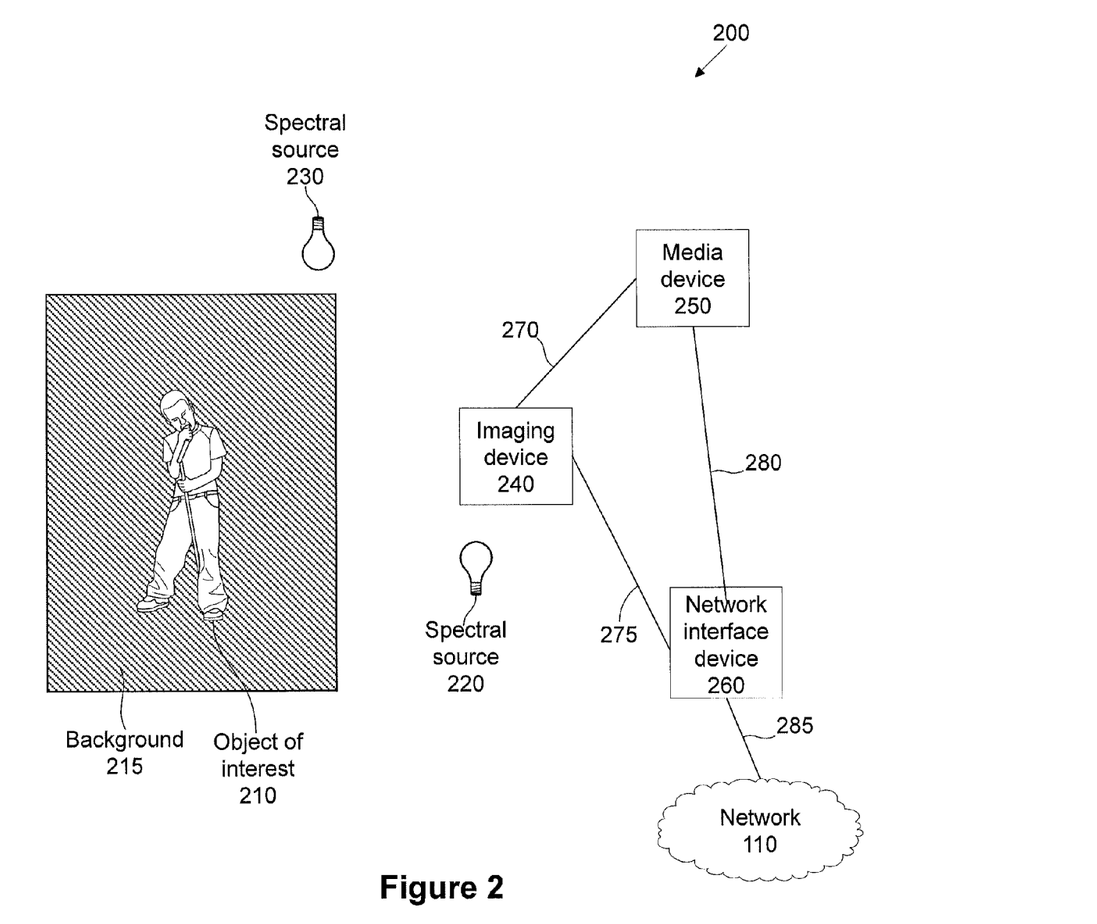
FIG. 2 illustrates an exemplary system for generating media content.

FIG. 2 illustrates an exemplary imaging system 200 at a location 135.

Object of interest 210 represents the subject for imaging system 200. Object 210 may be any animate or inanimate object. The object of interest 210 may be a person, as shown. A person may use the system for self-imaging through the use of timers or remote control. A timer may be set by the user to delay the start of the image capture, allowing the user to take a position in the area of image capture of system 200. Alternatively, the user may use a remote control device to activate or deactivate system 200 as desired. Self-imaging may also be accomplished in the capture of a dynamic image without timers or remote control, with the result that the user's self-positioning is captured by system 200 along with the desired images. FIG. 2 illustrates a person as the object of interest 210 against a background 215. Background 215 is the environment behind object 210 from the perspective of an imaging device 240. Imaging device 240 is discussed below.

Spectral sources 220 and 230 represent sources of illumination in two different spectra. System 200 may include additional spectral sources illuminating within the same spectrum as either source 220 or 230, or in spectra different from sources 220 and 230. Spectra may include, e.g., the ultraviolet spectrum in the approximate range of wavelengths 10 nanometers (nm) to 400 nm, the visible spectrum in the approximate range of wavelengths 400 nm to 700 nm, and the infrared spectrum in the approximate range of wavelengths 700 nm to 1 millimeter (mm). Spectral source 220 or 230 may illuminate only within a certain wavelength range of a spectrum, e.g., only within the near-infrared range 700 nm to 1400 nm. Furthermore, spectral source 220 or 230 is not limited to emitting within the spectra delineated above, but may emit within any range of wavelengths across the full frequency spectrum. The range of wavelengths emitted by a source 220 or 230 is referred to generally as the spectrum for that source. The ranges of wavelengths of sources 220 and 230 may overlap.

Spectral sources 220 and 230 may be one source emitting broadband, wherein broadband refers to emissions across a range of wavelengths of enough breadth to enable imaging device 240 to capture images within at least two distinct portions of the range of wavelengths.

A spectral source 220 or 230 may be ambient lighting such as, e.g., incandescent lighting, fluorescent lighting, and natural light.

Imaging device 240 captures images in the multiple spectra of the spectral sources. For example, if source 220 is in the infrared spectrum and source 230 is in the visible spectrum, then imaging device 240 would be configured to capture an image in the infrared spectrum and an image in the visible spectrum. For an approach wherein spectral sources 220 and 230 are one source emitting broadband, imaging device 240 would be configured to capture two images within two distinct ranges of wavelengths. Imaging device 240 may capture more than two images, and the more than two images may be in two or more spectra. For example, two images may be captured in the visible light spectrum, e.g., in red and in blue, and a third image may be captured in the infrared spectrum. Continuing with the example, the third image may be used to mask the red and blue spectrum images, as described below, and the masked red and blue images may be combined and then composited for use in a three-dimensional (3-D) application.

Media device 250 may be any device capable of storing media content. Media device 250 may be, e.g., a computing device, a music recording/playback device, etc. Additionally, media device 250 may include software modules for filtering or mixing media signals, and may include a display. Media device 250 is illustrated as a single device; however, the functions of media device 250 may instead be implemented in multiple devices. For example, media device 250 may comprise the separate components of stereo system, audio and/or video mixer, computer, and television display. Furthermore, the capability that media device 250 represents may be physically located distant from imaging device 240, e.g., located in another building and accessed by imaging device 240 via a network such as a network 110, including from server 115 or 125.

Network interface device 260 may be any one of a number of computing devices that allow a user to communicate via network 110. For example, interface device 260 may include a desktop computer, a laptop computer, a mainframe computer, a mini-computer, a cell phone, a personal digital assistant, or other similar device. Interface device 260 may also include one or more software applications for facilitating such communication over network 110, e.g., a web browser or the like. Alternatively, network interface device 260 may simply be a modem.

Imaging device 240, media device 250, and network interface device 260 are illustrated in FIG. 1 as being separate devices. However, in other approaches, the functions of devices 240, 250 and 260 may be included in one device or in a combination of devices. In one example, media device 250 may be a multimedia delivery system with a network interface device 260, which may also include an imaging device 240. A device that includes at least a combination of the functions of devices 240, 250 and 260 may be a set-top box, and further may be a set-top box of a multimedia service provider.

Connections 270, 275 and 280 represent any direct wired or wireless uni-directional or bi-directional interconnections between the elements illustrated in FIG. 2. Connections 270, 275 and 280 may alternatively represent connections through a wired or wireless personal area network (PAN) or local area network (LAN), instead of direct-wired connections as shown. Connection 285 represents any wired or wireless access to a network such as a network 110.

Imaging device 240 may communicate with media device 250 over connection 270 to retrieve media content for use in compositing with images generated by imaging device 240. Alternatively, imaging device 240 may transmit generated images to media device 250 for storage or processing. For example, media device 250 may include a software module for compositing images. Media device 250 may communicate with a computing device external to location 135 through network interface device 260 via connection 280, e.g., to transmit or receive media content.

Imaging device 240 may also communicate directly with a computing device external to location 135 through network interface device 260 via connections 275 and 285. For example, if a location 135 does not include a media device 250, or the media device 250 does not contain the desired media content or processing capability, imaging device 240 may retrieve media content from or transmit images to, e.g., a server 115 or 125.

Figure 3:
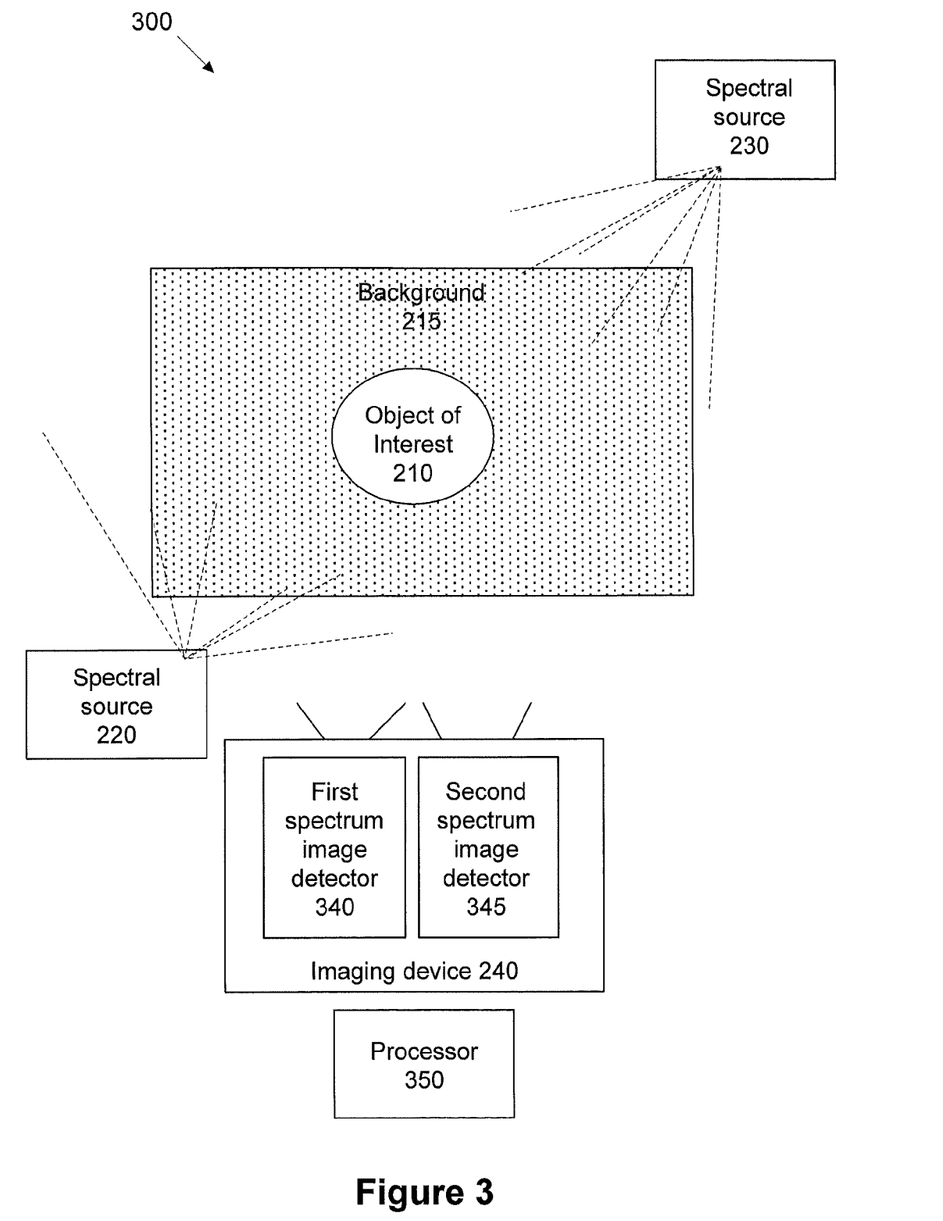
FIG. 3 illustrates an exemplary system for image capturing in multiple spectra.

FIG. 3 illustrates an exemplary system 300 including an imaging device 240 as used in a location 135.

An object of interest 210 is positioned within a location 135. The object of interest 210 may be any object, e.g., human or other animal, plant, insect, inanimate, etc.

Background 215 is the environment behind object 210 from the perspective of an image detector, such as image detector 340 or 345, discussed below. System 300 is independent of any particular background, so that the background may be from any environment. For example, the environment and corresponding background may be a living room of a home, a community gathering place such as a bar, a commercial photographic studio, a corporate boardroom, etc. Background 215 may also be in an outdoor environment.

Image detectors 340 and 345 represent two of the functions of imaging device 240. Image detector 340 captures images of object 210 against a background 215 within the spectrum emitted by spectral source 220. Image detector 345 captures images of object 210 against a background 215 within the spectrum emitted by spectral source 230. Generally, image detectors 340 and 345 are positioned in close proximity to each other in relation to the distance from object 210 such that the background 215 from the perspective of both image detectors is substantially the same. Multiple pairs of image detectors 340 and 345 may be positioned around the object 210, and then the background 215 for each pair of detectors 340 and 345 would generally be different. Placement of multiple pairs of image detectors 340 and 345 may be used, e.g., to provide multiple camera angles for a newscast, or to create a three-dimensional (3-D) image.

Image detectors 340 and 345 may be included within one imaging device 240. Alternatively, one of the detectors 340 or 345 may be included within an imaging device 240 and the other detector 340 or 345 may be included in a detachable support mechanism mounted to an imaging device 240. For example, a camera may be retrofitted with a support mechanism including an image detector. A camera may be any digital or analog, still or video, image capture device, including webcams and hand-held devices such as camcorders, webcams, camera phones, personal digital assistants and the like.

One or more of spectral sources 220 and 230 may also be included in imaging device 240. For example, one or both spectral sources 220 and 230 may be one or more light emitting diodes (LEDs) mounted on or within imaging device 240. Alternatively, one of spectral sources 220 or 230 may be mounted on or within imaging device 240 and the other of sources 220 or 230 may be located remotely from imaging device 240. Furthermore, instead of mounting a source 220 or 230 on or within imaging device 240, a source 220 or 230 may be on a support mechanism detachably mounted to an imaging device 240. A support mechanism including a source 220 or 230 may also include an image detector 340 or 345, as discussed above. For example, a support mechanism may include one or more infrared LEDs and one or more infrared image detectors 340 or 345. Exemplary support mechanisms are described below with respect to FIGS. 8B and 8C.

Processor 350 may be included within a computing device, such as media device 250, server 115 or 125, or any other device accessible by imaging device 240 within location 135 or through a network 110. Processor 350 alternatively may be an embedded microprocessor within imaging device 240. Processor 350 may generate a combination image from images captured by detectors 340 and 345, and may composite a combination image with a selected image. The combination image or composite image may be stored for later retrieval in a memory, or may be provided in near real time as an analog or digital signal to a computing device internal or external to location 135. Near real time refers to a representation of a live action, wherein the representation is received after a processing and transmission delay.

In one exemplary approach, one webcam operable in the visible spectrum and one webcam operable in the infrared spectrum are positioned in close proximity to each other and in communication with an associated computing device. The outputs of the webcams are processed by a processor 350 in the associated computing device. The resulting processed image is transmitted in near real time through a network interface device 260 in the associated computing device to another computing device, via network 110. The processing of the image may, in addition to the combining and compositing techniques described below, include compression to maximize transmission rate. In another exemplary approach, imaging device 240 includes image detectors 340 and 345 and processor 350, and a processed image is stored in a memory in imaging device 240 for later retrieval.

Processor 350 may be multiple processors in different locations. For example, a first processor may be included in imaging device 240 and may convert images captured by image detectors 340 and 345 to a particular format for storage or transmission. A second processor may receive the images from the first processor and generate a combined image for storage or transmission. Yet a third processor may then receive the combined image and composite the combined image with an image received from a media device 250.

Figure 4:
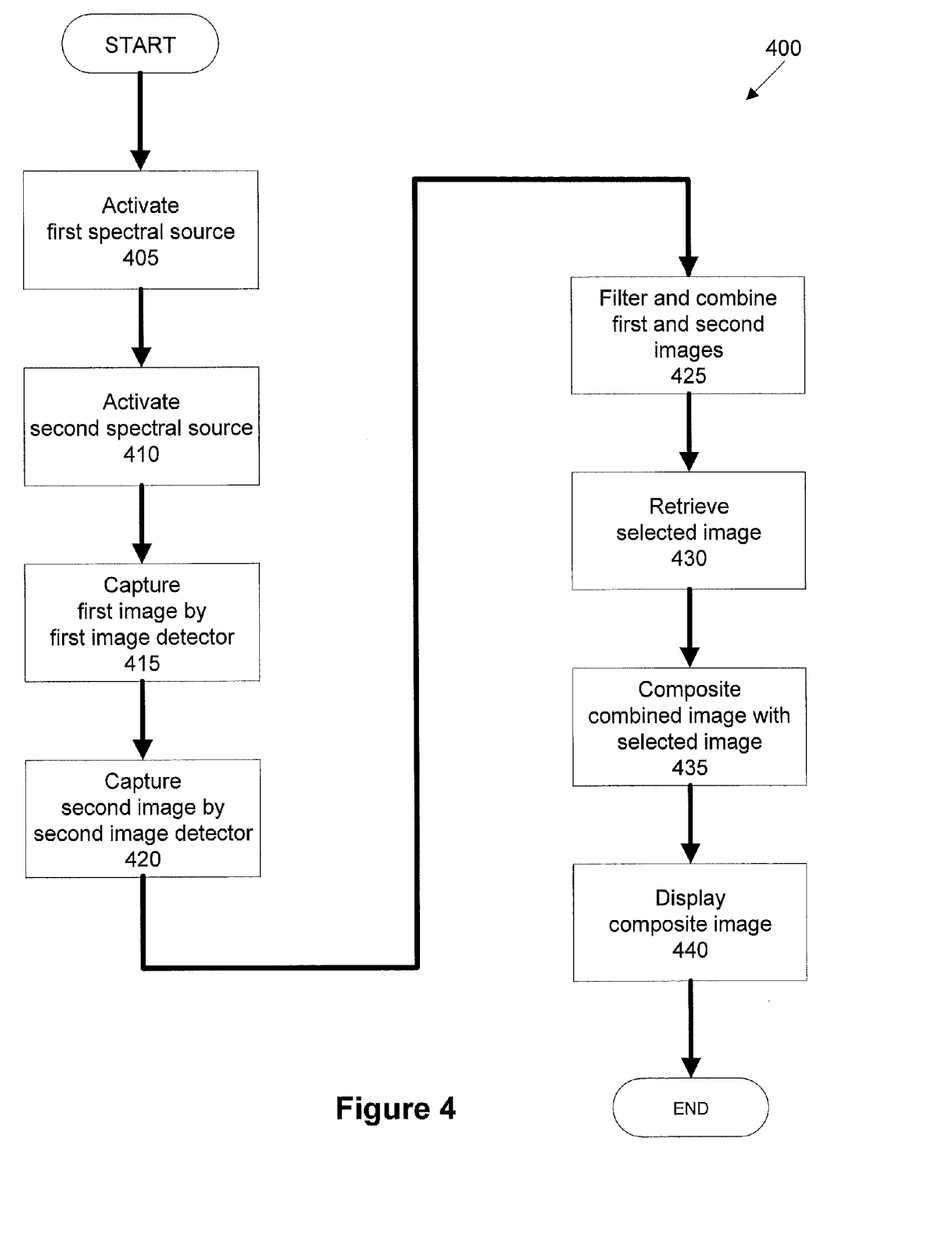
FIG. 4 illustrates an exemplary process for compositing an image.

FIG. 4 illustrates an exemplary process 400 for generating a composite image from a selected image and images captured by image detectors 340 and 345. Process 400 begins with block 405. A first spectral source 220 is activated (405) and a second spectral source 230 is activated (410). The second spectral source 230 is operable within a different spectrum than the first spectral source 220. A first image detector 340 then captures (415) a first image. The first image detector 340 is operable within the same spectrum or range of wavelengths as the emissions from the first spectral source 220. A second image detector 345 captures (420) a second image. The second image detector 345 is operable within the same spectrum or range of wavelengths as the emissions from the second spectral source 230.

The first and second images are filtered and combined with each other to generate (425) a combined image. An exemplary process for filtering and combining images is described below with respect to process 500. Next, an image selected by a user from a catalog or listing of available media is retrieved (430). The available media may be stored in data store 120 or 130, in media device 250, or in any other media storage device available in location 135 to the user, or available to the user via a network 110. The selected image may be a static image, or may be a pre-recorded or near real-time video sequence.

The combined image generated (425) previously is composited with the selected image retrieved (430) to generate (435) a composite image. The selected image may be a background image used to replace the background 215 of the combined image, such that the object of interest 210 appears to have been in front of the scene in the selected image at the time when the first and second images were captured. Compositing includes replacing a portion of one image with a portion of one or more other images. An exemplary process for compositing is described below with respect to process 550. The composited image is displayed (440) on media device 250 or other display device. Alternatively the composited image may be stored for later access. Next, process 400 ends.

Figure 5A:
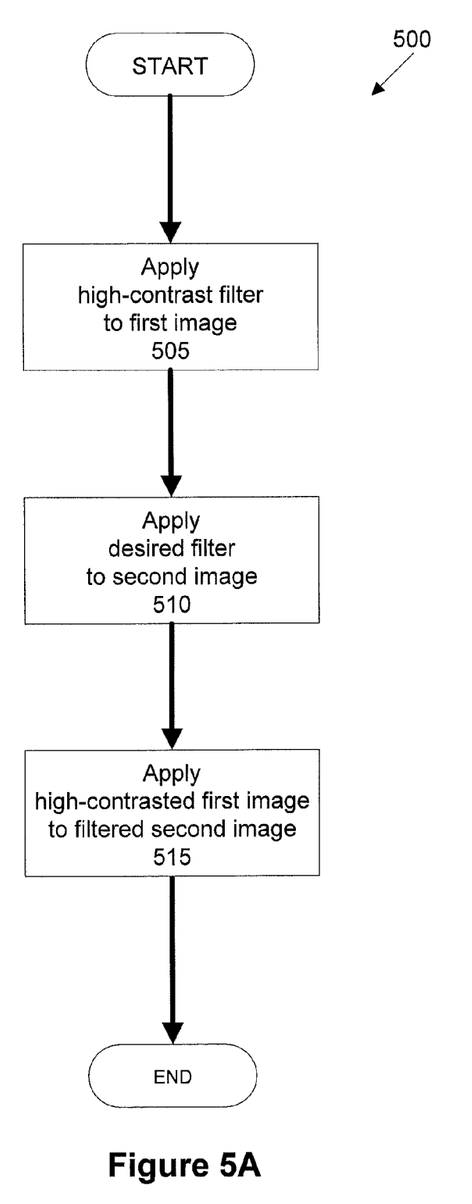
FIG. 5A illustrates an exemplary process for filtering an image.

FIG. 5A illustrates process 500 that is exemplary for combining (425) images as mentioned above. A high-contrast filter is applied (505) to the first image captured by the first image detector 340, resulting in a high-contrast image. The first image as captured may be in grayscale, such that all of the colors in the first image are shades of gray and the image varies in intensity not in color. Alternatively, the first image may be monochromatic in any other color, or multichromatic. Regardless of the color makeup of the image, the first image as captured generally has a noticeable contrast of intensity between the image of the object of interest 210 and the background. The high-contrast filter, when applied to the first image, emphasizes the existing contrast, resulting in an essentially black background, and an essentially white area on the portion of the first image attributable to the object of interest 210. This process is discussed in more detail with respect to FIG. 7, below. The terms "essentially black" and "essentially white" indicate a large difference in intensity, and may represent any two colors or shades with a distinctive difference in intensity. Alternatively, the high-contrast image may include more than two colors or shades with distinctive differences in intensity to allow for additional compositing or processing options. The terms "black" and "white" used in discussions herein related to high-contrast filtering refer to the "essentially black" and "essentially white" areas described in block 505.

Next, a desired filter may optionally be applied (510) to the second image. Filtering may include, e.g., contrast adjustment, color scale adjustment, sharpness adjustment, smoothing, and haloing. The generated (505) high-contrast image is then applied (515) to the second image as captured, or to the filtered (510) second image. The high-contrast image is applied as a mask. The border between the white and black portions of the high-contrast image outlines the portion of the second image to be retained: the white portion of the high-contrast image corresponds to the area of the second image to be retained; the black portion of the high-contrast image corresponds to the area of the second image to be discarded. The combined image resulting from application of the high-contrast image to the second image is essentially the image of the object of interest 210 from the second image, with a black background. As discussed above, the first image detector 340 and second image detector 345 are generally placed in close proximity to each other with respect to their distance from the object of interest 210, and therefore the outline of the white portion of the high-contrast image should match the outline of the image of the object of interest 210 on the second image within a margin of error. Next, process 500 ends.

Figure 5B:
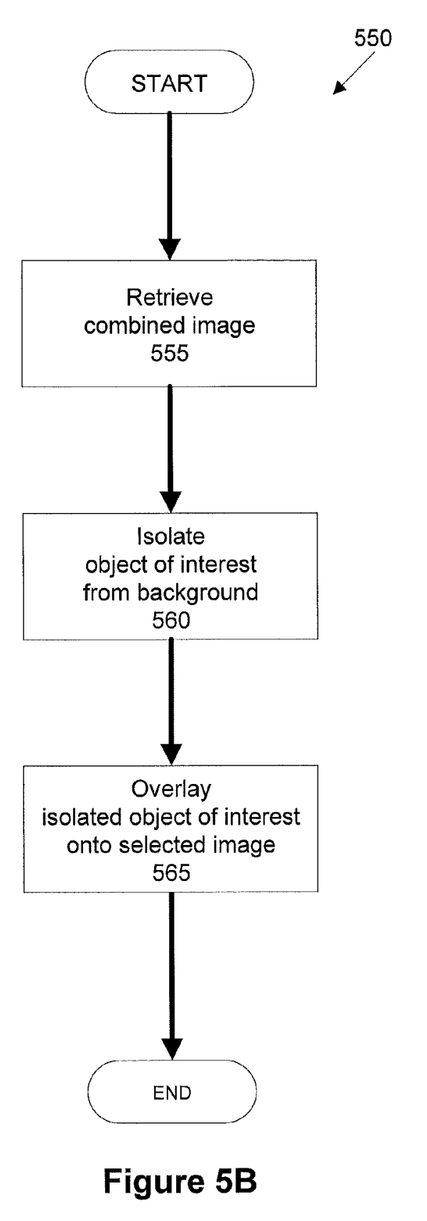
FIG. 5B illustrates an exemplary process for compositing images.

FIG. 5B illustrates process 550 that is exemplary for compositing (435) images, as mentioned above. A combined image is retrieved (555) from, e.g., memory in a device in location 135 or in network 110, such as media server 125. Retrieval may be in near real time, e.g., following directly after the process of combining images. The image of the object of interest 210 is isolated (560) from the combined image. As discussed above, the combined image is the image of the object of interest 210 with an artificially dark background. Thus, isolating the object of interest 210 essentially comprises removing the dark background from around the image of the object 210. In a digital system, isolation may include, e.g., identifying pixels in the combined image that fall below a predefined intensity threshold, or whose color falls within a predefined range of wavelengths. In an analog system, isolation may include filtering frequencies representing the background color out of the analog signal representing the combined image.

The isolated image of the object of interest 210 is overlaid (565) onto a selected image. In a digital system, for example, a computing device may be programmed to identify pixels of the background, as discussed above. When the computing device identifies such a pixel, the pixel value may be replaced with the value of the corresponding pixel in the selected image. Corresponding pixels are pixels located at the same coordinates on the combined image and the selected image. A pixel value may be a single number representing color or intensity of a pixel, or may be a matrix or vector of numbers representing intensity and percentages of, e.g., red, blue and green in the pixel.

In an alternative exemplary digital system, a computing device may be programmed to identify a pixel above a threshold of intensity or other pixel value, and replace the corresponding pixel in the selected image with the identified pixel from the combined image.

In an exemplary analog system, the frequency of the background color may be filtered out of the combined image, and the remaining information in the analog signal may replace the corresponding information from the selected image. For example, the analog signal may be referenced to a coordinate system of pixels based on time, so that during a particular time segment the signal carries information about one pixel or set of pixels. The combined image, with the background color frequencies filtered out, may have a signal only during certain time periods representing certain pixels. The coordinate system of the selected image may also be referenced based on time. Thus, if the timing of the combined image signal and the selected image signal are aligned, during the time periods in which there is a signal for the combined image, the signal of the combined image replaces the signal for the selected image.

For digital or analog systems, additional processing may be required to recognize the border between the dark background and the image of the object of interest 210 to prevent dark areas within the image of the object 210 from being replaced by corresponding areas from the selected image. For example, if the object of interest 210 was a person wearing a sweatshirt with dark lettering, recognition of the border would keep the processor from erroneously identifying the pixels in the lettering as background area to be replaced.

Process 550 may be a set of instructions followed by a computing device within a location 135 or anywhere within a network 110, including a server 115 or 125. The computing device may be, for example, a service provider server 115. In such an exemplary approach, the service provider may receive a near real time video feed of a combined image from a location 135, composite the combined image with a selected image, and provide the composited image back to location 135 for display. In another exemplary approach, process 550 is a set of instructions followed by a computing device within a home environment, e.g., by a karaoke machine. In such an exemplary approach, a person may capture images of another person within the home, composite the images with a background scene, and display the composite images on, e.g., a television screen.

Process 500 may, in addition to the steps shown, include a step of adding special effects to one or more of the combined images, or to the composite image as a whole. Special effects may include, e.g. strobing, spinning, fading, flying in or out, and transposition of the images. Next, process 550 ends.

Figure 6:
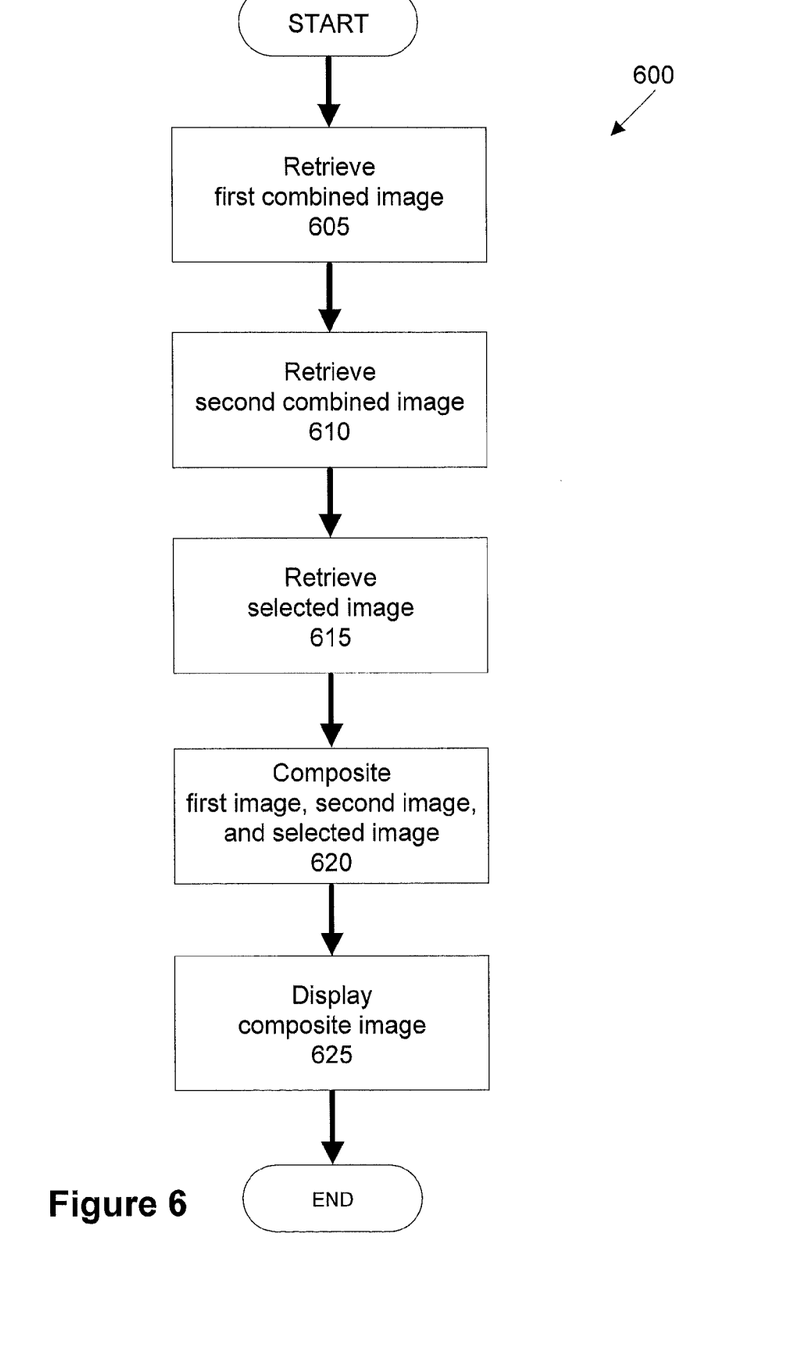
FIG. 6 illustrates an exemplary process for compositing images from multiple imaging devices.

FIG. 6 illustrates an exemplary process 600 for compositing multiple combined images. For example, persons within multiple homes may wish to create a composited video including the persons in the multiple homes, and then locally display the composited video, or transmit the composited video to a third party. Such a composited video may, e.g., be a video birthday card to a parent from children residing in separate homes.

A first combined image is retrieved (605) from, e.g., a data store 120 or 130 or a media device 250. The first combined image may be a stored image or near real time image, and may be a static image or a video sequence. A second combined image is retrieved (610) in like manner to the retrieval of the first combined image. A selected image is retrieved (615) in like manner to the retrieval of the first combined image.

The first combined image and the second combined image are composited (620) with the selected image in a process similar to that described above with respect to process 550. A computing device may composite in sequence, e.g., compositing the first combined image with the selected image, followed by compositing the second combined image with the previously-composited image. Alternatively, the computing device may composite the first and second combined images with the selected image in parallel, e.g., isolating the images of the objects of interest 210 from each of the combined images and overlaying the isolated images of the objects 210 onto the selected image substantially simultaneously. For the latter case, a prioritization scheme may be included in the process, so that either the isolated object of interest 210 from the first or the second combined image appears in front. Otherwise, the images of the objects of interest 210 might blend into each other and be unrecognizable. A prioritization scheme may be implemented such that users in locations 135 may select which object should appear in front.

Although process 600 is illustrated as compositing two combined images with a selected image, process 600 may composite an unlimited number of combined images with one or more selected images, limited only by the resources of the computing device performing the process, e.g., memory and processing power.

The composited image is provided (625) to a display. In one exemplary approach, a computing device in a location 135 performs the steps of process 600 and sends the composited image to a display device within location 135. In an alternative exemplary approach, a service provider server 115 may receive combined images from multiple origination locations 135 via a network 110, composite the combined images with one or more selected images, and deliver the resulting composited image via a network 110 to the multiple origination locations 135 and/or to multiple non-origination locations 135. For example, a service provider may enable multiple users to perform in front of imaging devices 240 in multiple locations 135 and transmit the performances in near real time to the service provider, whereupon the service provider generates a composite of all of the performances and transmits it back to the multiple users or other users. In this manner, users from multiple locations 135 may appear to be performing in a band, circus, choir, drama, etc. at a single location.

Next, process 600 ends.

Figure 7:
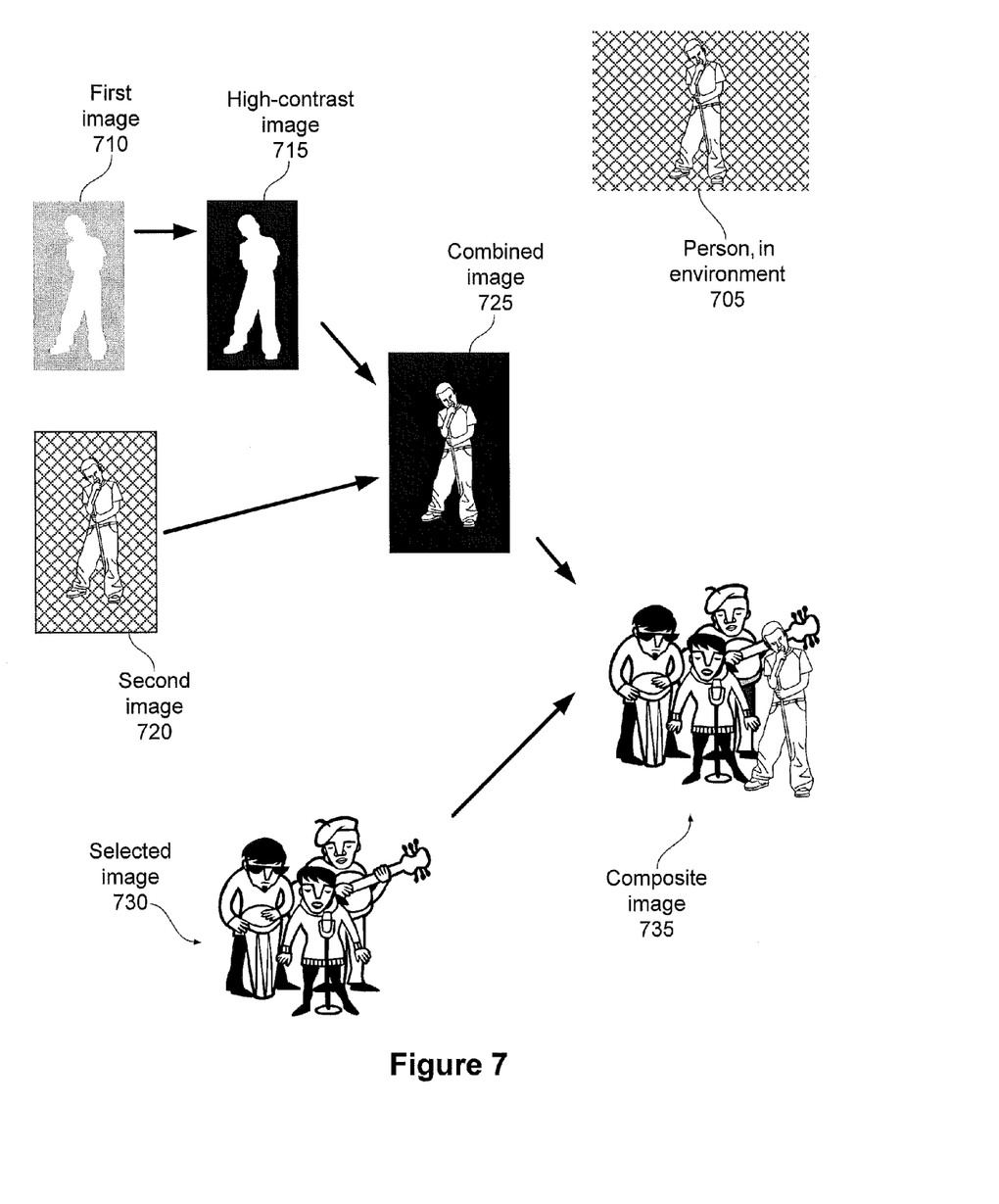
FIG. 7 further illustrates an exemplary process for compositing an image.

FIG. 7 illustrates graphically an exemplary implementation of portions of processes 500 and 550. A person performs within environment 705. An imaging device 240, not shown, captures a first infrared image 710 and a second image 720. Second image 720 is shown as a black-and-white image but may also be a color image. High-contrast filtering is applied to the first image 710, resulting in a high-contrast image 715. The white portion of high-contrast image 715 is used to isolate, or mask, the image of the person from the second image 720. The result of the masking is a combined image 725, in which the image of the person is surrounded by black.

A previously-selected image 730 of a band is composited with the combined image 725. In the resulting composite image 735, it appears that the person is performing along with and in the same location as the band from the selected image 730. Although only one person is shown in FIG. 7, any number of persons may be included in the composited image 735, as discussed above. Further, processing may end after generating the combined image 725, without the further step of compositing with a selected image, such that the person is displayed as an isolated image on a dark background.

In an alternative implementation, thermal imaging could be used to detect an object of interest 210, either with or without the use of spectral sources 220 or 230. In this implementation, a thermal image of the object of interest 210 could be captured, a high-contrast filter applied to the thermal image to create a high-contrast image, and the resulting high-contrast image applied to an image captured in another manner to create a combined image.

The preceding discussions illustrated system 100 with image detectors operating within various spectra. Alternative implementations are also possible. For example, narrow band frequency detection could replace spectral image detection.

In one implementation using narrow band frequency detection, high frequencies such as high frequency audio may be directed towards the object of interest 210, and one or more frequency band detectors could then capture high frequencies reflected by the object of interest 210. The resulting echo could define an image of the object of interest 210, which could then be filtered with a high-contrast filter.

Another implementation using narrow band frequency detection includes lasers emitting in a narrow frequency band, and frequency detectors detecting light reflected from the object of interest 210 within that frequency band. In this implementation, one or more lasers would be directed towards the edges of the object of interest 210, and the reflected light would indicate a boundary between the object of interest 210 and its background 215. Further within this implementation, the boundary indicated by the reflected light could then be used to isolate the object of interest 210 from an image of the object of interest 210 captured in another manner.

Multiple types of imaging such as those described may be combined to create high resolution masks and correspondingly high resolution composited imaging. For example, any of laser imaging, thermal imaging, infrared or other spectral detection imaging, and narrow band frequency detection may be combined in any manner and in any order, with filtering as desired.

In each implementation described, filtering at any stage of any process may be performed in multiple stages by multiple devices or processes across multiple locations 135, and may be performed by analog and/or digital means. Further, filtering of an image with a high-contrast filter may include inversion, such that the background is darker than the object of interest 210 in the high-contrast image. Filtering may additionally include adding opacity to an image, and may include graduated opacity, such that the image or the background of the high-contrast image includes varying degrees of opacity.

Implementations creating a high-contrast image may alternatively or additionally create a border identifying the outline of the object of interest 210. The distinction between creating a border and creating a high-contrast image is a function of the filtering method. For example, the difference may be in the selection of a filtering software module, and such a software module may be interchangeable with other filtering software modules. A selection of a software module may be based on, e.g., processing requirements such as throughput and memory space, transmission requirements such as bandwidth or protocol, or compatibility requirements for the system or for other software. Multiple filtering software modules may be used in any order, e.g., to create both a high-contrast image and a border.

In each implementation described, the combined image may be used independently without the further step of compositing. For example, the combined image may be used for display separately or as part of a collage e.g., in a frame or a scrapbook or on a web page. A display on a web page or other display device may be static or dynamic. Further, the high-contrast image could be displayed separately as a silhouette, statically or dynamically.

Having discussed the system and methods for generating, transmitting, and displaying composited images, some alternatives for the construction of an imaging device 240 will be discussed.

Figure 8A:
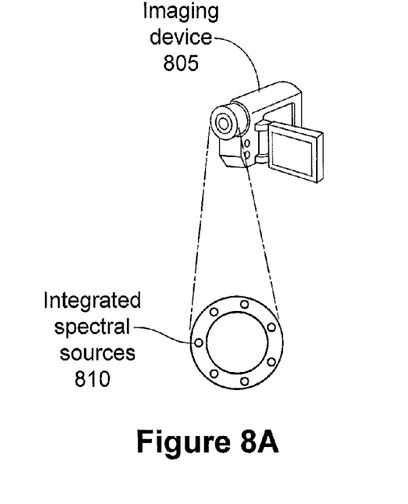
FIGS. 8A-8C illustrate exemplary apparatuses for image capturing.
Figure 8B:
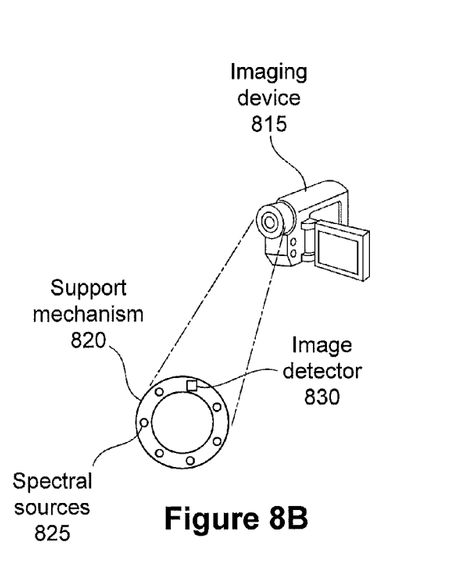
Figure 8C:
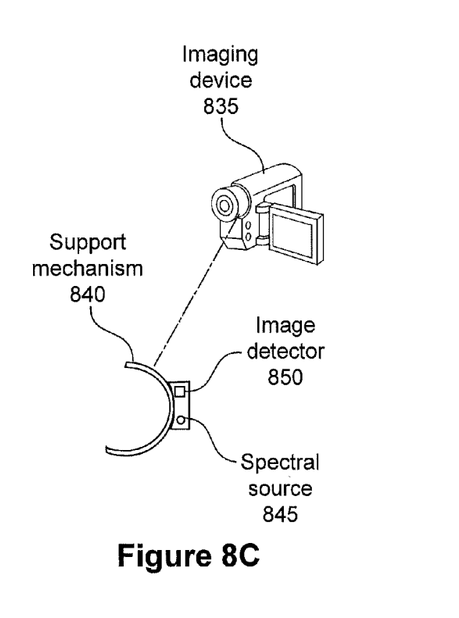

FIGS. 8A-8C illustrate three of the many alternatives for an imaging device 240. The imaging devices in FIGS. 8A-8C are illustrated as camcorders for simplicity; however, an imaging device 240 may be, e.g., any digital or analog, still or video, image capture device, including webcams and hand-held devices such as camera phones, personal digital assistants and the like.

FIG. 8A illustrates an imaging device 805 with integrated spectral sources 810. Spectral sources 810 are illustrated in exemplary form as an integrated set of light emitting diodes (LEDs) around the edge of the lens of a camcorder. Spectral sources 810 may be any number of LEDs, or may be one LED, and may be situated anywhere on imaging device 805 that allows sources 810 to illuminate an object in front of the imaging device 805. A spectral source 810 may, alternative to LEDs, be any source of emission in the spectrum of choice, e.g., an incandescent or other bulb. Furthermore, spectral sources 810 may emit in multiple spectra. Imaging device 805 may also include reflective and/or refractive areas to focus the desired spectrum of emissions toward the object of interest 210.

Imaging device 805 includes image detectors 340 and 345, not shown, that capture images at least in the spectra emitted by the spectral sources 810, and perhaps in other spectra such as in the spectra of the ambient lighting. Imaging device 805 may include a number of image detectors equal to, greater than, or less than the number of alternative spectra emitted by spectral sources 810.

FIGS. 8B and 8C illustrate imaging devices with exemplary detachable support mechanisms including spectral sources and image detectors. A detachable support mechanism may be a retrofit for a previously-acquired imaging device, or may be acquired with the imaging device as a removable compositing tool. For example, a previously-purchased cellular phone may be upgraded with a plug-in hardware attachment, and a corresponding new software application.

FIG. 8B illustrates a detachable support mechanism 820 that fully encircles the lens of imaging device 815. Support mechanism 820 includes spectral sources 825 and image detector 830. Spectral sources 825 are illustrated in exemplary form as a set of light emitting diodes (LEDs). Spectral sources 825 may be any number of LEDs, or may be one LED. A spectral source 825 may alternatively be any source of emission in the spectrum of choice, e.g., an incandescent or other bulb. Furthermore, spectral sources 825 may emit in multiple spectra. Support mechanism 820 may also include reflective and/or refractive areas to focus the desired spectrum of emissions toward the object of interest.

Support mechanism 820 may include one or more image detectors 830 that capture images in the spectra emitted by the spectral sources 825. Support mechanism 820 may include a number of image detectors equal to, greater than, or less than the number of spectra emitted by spectral sources 825.

FIG. 8C illustrates a detachable support mechanism 840 that partially encircles the lens of imaging device 835. Support mechanism 840 includes spectral source 845 and image detector 850. Spectral source 845 may be any number of LEDs or may alternatively be any source of emission in the spectrum of choice, e.g., an incandescent or other bulb. Furthermore, spectral source 845 may emit in multiple spectra. Support mechanism 840 may also include reflective and/or refractive areas to focus the desired spectrum of emissions toward the object of interest.

Support mechanism 840 may include one or more image detectors 850 that capture images in the spectra emitted by the spectral source 845. Support mechanism 840 may include a number of image detectors equal to, greater than, or less than the number of spectra emitted by spectral source 845.

CONCLUSION

A system and technique have been described for creating an image from two or images in different spectra. A further technique has been described for compositing the image with other images. The system and techniques may include imaging and processing in multiple locations.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation. For example, all references herein to compositing images, or compositing video, may also include adding to the composited video or image a corresponding mix of audio signals or other information related to the composited image.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

Reference in the specification to "one example," "an example," "one approach," or "an application" means that a particular feature, structure, or characteristic described in connection with the example is included in at least one example. The phrase "in one example" in various places in the specification does not necessarily refer to the same example each time it appears.

What is claimed is:

1. A method, comprising:
    receiving a spectral image captured in a predefined spectrum;
    directing a laser beam towards the periphery of an object of interest;
    receiving reflections of the laser beam emissions;
    forming a boundary indication from the reflections of the laser beam emissions; and
    applying the boundary indication to the spectral image to isolate an image of the object of interest from the spectral image.

2. The method of claim 1, further comprising:
    forming a series of boundary indications from the reflections of the laser beam emissions, each boundary indication differing from a preceding boundary indication; and
    applying each of the boundary indications to the spectral image to isolate a series of images of the object of interest from the spectral image, the series of images representing movement of the object of interest.

3. The method of claim 1, further comprising creating a composite image from the isolated image and a selected image.

4. The method of claim 1, wherein the selected image is one of a static image, a pre-recorded video sequence, and a near real-time video sequence.

5. A system comprising:
    a source configured to illuminate an object of interest with emissions in a predefined spectrum to generate a spectral image;
    a first image detector operable within the predefined spectrum and generating a spectral image;
    at least one laser configured to generate a laser beam emission in a predefined frequency band;
    at least one frequency detector configured to detect reflections from the laser beam emission to generate a boundary indication around the object of interest; and
    a processor configured to apply the boundary indication to the spectral image to isolate an image of the object of interest from the spectral image.

6. The system of claim 5, wherein the processor is configured to apply a series of boundary indications to the spectral image to isolate a series of images of the object of interest, the series of images representing movement of the object of interest.

7. The system of claim 5, further comprising a compositing component configured to composite the isolated image with a selected image to form a composite image.

8. The system of claim 7, wherein the selected image is one of a static image, a pre-recorded video sequence, and a near real-time video sequence.

9. The system of claim 7, wherein at least one special effect is included in the composite image.

10. The system of claim 7, wherein at least one of the first and second image detectors captures dynamic images.

11. The system of claim 6, wherein the system is a gaming system.

12. The system of claim 6, wherein the system is integrated within a hand-held device.

13. The system of claim 12, wherein the hand-held device is one of a personal digital assistant, a telephone, a cellular phone, and an audiovisual playback device.

* * * * *